United States Patent
Wadsworth (10) Patent No.: US 11,865,803 B2
(45) Date of Patent: Jan. 9, 2024

(54) CONTINUOUS MANUFACTURING PROCESS FOR COMPOSITE PARTS

(71) Applicant: SPIRIT AEROSYSTEMS, INC., Wichita, KS (US)

(72) Inventor: Mark Anthony Wadsworth, Sedan, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 0 days.

(21) Appl. No.: 17/692,104

(22) Filed: Mar. 10, 2022

(65) Prior Publication Data
US 2022/0194040 A1    Jun. 23, 2022

Related U.S. Application Data

(62) Division of application No. 16/576,018, filed on Sep. 19, 2019, now Pat. No. 11,298,902.

(51) Int. Cl.
| | |
|---|---|
| *B29D 99/00* | (2010.01) |
| *B64C 1/00* | (2006.01) |
| *B64C 1/06* | (2006.01) |
| *B64C 1/12* | (2006.01) |

(52) U.S. Cl.
CPC .......... *B29D 99/0014* (2013.01); *B64C 1/064* (2013.01); *B64C 1/068* (2013.01); *B64C 1/12* (2013.01); *B64C 2001/0072* (2013.01)

(58) Field of Classification Search
CPC .. B29D 99/00; B29D 99/001; B29D 99/0014; B64C 1/00; B64C 1/06; B64C 1/064; B64C 1/068; B64C 1/10; B64C 1/12
See application file for complete search history.

(56) References Cited

U.S. PATENT DOCUMENTS

| | | | |
|---|---|---|---|
| 5,328,540 | A | 7/1994 | Clayton et al. |
| 8,349,105 | B2 | 1/2013 | Kehrl et al. |
| 10,654,199 | B2 | 5/2020 | Matsen et al. |
| 10,960,631 | B2 | 3/2021 | Humfeld et al. |

(Continued)

FOREIGN PATENT DOCUMENTS

| | | |
|---|---|---|
| CN | 102990939 B | 7/2015 |
| KR | 10-1717414 B1 | 3/2017 |

OTHER PUBLICATIONS

International Search Report and Written Opinion in related PCT application No. PCT/US2020/050138, dated Dec. 24, 2020, 9 pages.

*Primary Examiner* — Jacob T Minskey
*Assistant Examiner* — Matthew Hoover
(74) *Attorney, Agent, or Firm* — Hovey Williams LLP (57) ABSTRACT

Tooling assembly and pressure vessel thereof for forming composite components such as aircraft stringers and the like. In addition to the pressure vessel, the tooling assembly may include a conveying apparatus and a forming tool for stacking plies on the forming tool and conveying the plies and the forming tool through the pressure vessel. The pressure vessel includes an entrance opening and an exit opening, which are sized and shaped to permit the forming tool supporting the plies to pass through the pressure vessel. The pressure vessel may further include an interior chamber housing multiple spheres. The spheres press against the plies as the forming tool is conveyed through the pressure vessel, thereby pressure treating the plies and forming the composite part.

20 Claims, 6 Drawing Sheets

(56) References Cited

U.S. PATENT DOCUMENTS

| | | | |
|---|---|---|---|
| 2011/0097554 A1* | 4/2011 | Kehrl | B29D 99/0003 |
| | | | 29/419.1 |
| 2014/0175696 A1 | 6/2014 | Foor et al. | |
| 2015/0376946 A1 | 12/2015 | Kurzer et al. | |
| 2019/0184610 A1* | 6/2019 | Matsen | B29C 70/549 |
| 2020/0061947 A1* | 2/2020 | Humfeld | B29C 70/545 |

* cited by examiner

CONTINUOUS MANUFACTURING PROCESS FOR COMPOSITE PARTS

RELATED APPLICATIONS

The present U.S. non-provisional patent application is a divisional and claims priority benefit of an earlier-filed U.S. non-provisional patent application with the same title, Ser. No. 16/576,018, filed Sep. 19, 2019. The entire contents of the identified earlier-filed application is incorporated by reference as if fully set forth herein.

BACKGROUND OF THE INVENTION

Stringers are stiffening members used to strengthen the skin of aircraft against buckling. Stringers typically extend along, and are joined to, an inner surface of aircraft skin of a wing or fuselage to reduce bending. The stringers transfer aerodynamic loads acting on the skin of the aircraft to frames, formers, ribs, or spars of the aircraft. Stringers may have any of various cross-sectional shapes including HAT-shaped stringers, I-shaped stringers, J-shaped stringers, Y-shaped stringers, and Z-shaped stringers, among others.

Traditionally, stringers were comprised of a stiff and preferably lightweight covering material such as alloys of aluminum, steel, and titanium. More recently, however, advanced forms of stringers have been made from composite materials such as multiple layers, or plies, of suitable filler or fiber material bonded together using a resin matrix or the like.

For composite stringers having a constant cross-section, the composite stringer may be produced using pultrusion or a similar process. Pultrusion is a continuous manufacturing process in which multiple plies of pre-impregnated fibers or similar material are stacked and pulled through a stationary die in which the plies are heated or cooled and thus cure or harden, respectively, into the desired cross-sectional shape. After leaving the die, the stringer can be cut to length. Although pultrusion is a relatively inexpensive process, pultrusion can only be used to create continuous cross-section stringers due to limitations of the die. Thus, pultrusion and similar processes have limited applicability for creating complex stringers and other components.

Often, however, stringers require a complex contour to accommodate the complex geometry of the skin to which the stringer is to be attached or to otherwise conform to the local contouring of the skin. Composite stringers requiring a varying cross-sectional thicknesses are thus formed using ply drops—that is, a variation in the numbers of strips, or plies, of fibers along the stringer's length to produce a variation in cross-sectional thickness. Stringers with ply drops cannot be formed using pultrusion or similar processes because the varying cross-profile thickness prevents the use of a die. Thus, manufacturing composite stringers having varying profiles is time consuming and relatively expensive.

Namely, such composite stringers are batched produced by layering plies including ply drops on a forming tool and hardening the plies in place. These complex stringers are often formed using autoclave molding or the like utilizing flexible bags that conform to the ply stack during hardening, thereby accommodating the ply drops and other complex geometry. However, the combination of high pressure and temperature required for thermoplastics and some thermo-sets makes these autoclaves rare and expensive. Also, since the autoclave is a batch, not continuous, process, the size of the autoclave limits the size of parts made and the heat/cooling rates are limited by the convective heat transfer rates associated with a gas filled autoclave.

Thus, there remains a need for a continuous manufacturing process that can be utilized to create varying length strengthening parts such as aircraft stringers, utilizing low-cost, single-sided tools, which can accommodate ply drops and other variations in the stringer profile.

BRIEF SUMMARY OF THE INVENTION

The present invention is directed to an improved process and tooling for creating a composite stringer or other composite reinforcing part. The process is a continuous manufacturing process used to create unlimited length parts without the need for implementing special or expensive tooling. The process and tooling includes the capability to accommodate various contours of stringers thus accommodating for ply drops and other irregular cross-sectional areas along the length of the stringer.

For example, some embodiments of the invention are directed to a pressure vessel for forming a composite part such as a stringer or other reinforcing part used for a vehicle. The pressure vessel includes an entrance opening at an upstream end of the pressure vessel, which is sized and shaped to receive a forming tool supporting a plurality of plies as the forming tool is conveyed through the pressure vessel. The pressure vessel further includes an exit opening provided at a downstream end of the pressure vessel, which is sized and shaped to allow the forming tool to exit the pressure vessel after it is conveyed therethrough. The pressure vessel includes an interior chamber between the entrance opening and the exit opening housing multiple spheres. The spheres are configured to press against the plurality of plies as the forming tool is conveyed through the pressure vessel, thereby pressure treating the plies and forming the composite part.

Other embodiments of the invention are directed to a tooling assembly for forming such a composite part such as a stringer or other reinforcing part used for a vehicle. The tooling assembly includes an elongated conveying apparatus and a forming tool that supports the plies used to form the composite part, which is movably supported by the elongated conveying apparatus. The tooling assembly further comprises a pressure vessel disposed along the elongated conveying apparatus such as the pressure vessel described above.

Still other embodiments of the invention are directed to a method for forming a composite part. The method includes stacking pre-impregnated plies on a forming tool including creating at least one ply drop in the ply stack and conveying the ply stack and the forming tool through a pressure vessel. For example, the ply stack and the forming tooling may be conveyed through the pressure vessel described above. The method includes pressing the ply stack against the forming tool using multiple spheres located within an interior chamber of the pressure vessel. The method also includes cutting the composite part to length after it has exited the pressure vessel.

These and other features will be discussed in more detail below in connection with the accompanying drawings.

BRIEF DESCRIPTION OF THE DRAWINGS

The present invention is described in detail below with reference to the attached drawing figures, wherein.

DETAILED DESCRIPTION OF THE INVENTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments, but is not necessarily included. Thus, the current technology can include a variety of combinations and/or integrations of the embodiments described herein.

Figure 1:
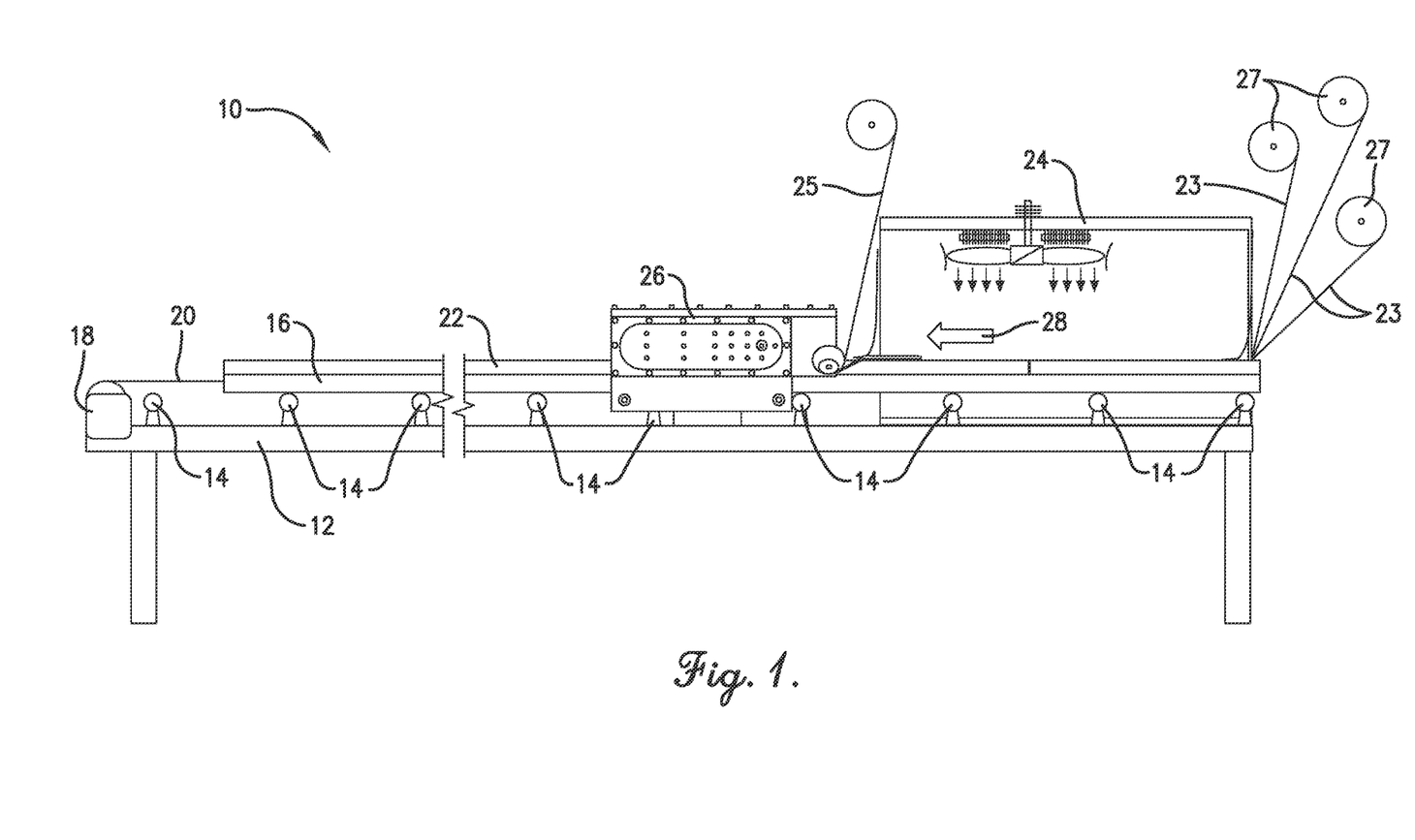
FIG. 1 is a side elevation view of a tooling assembly used to manufacture composite reinforcing components such as composite stringers and the like according to aspects of the invention.

Generally, aspects of the invention are directed to a method of forming a composite part such as an aircraft stringer or the like from multiple plies of pre-impregnated fiber or other matrix and resin and the tooling used to form the same. More particularly, FIG. 1 shows a tooling assembly 10 used to produce composite reinforcing members having a constant or non-constant cross-sectional profile on a continuous basis. In a preferred embodiment, the tooling assembly 10 is used to produce a composite aircraft stringer having a varying (that is, non-constant) cross-sectional thickness, however the tooling assembly 10 can be used to produce other composite components having either a constant or non-constant profile without departing from the scope of the invention.

The tooling assembly 10 generally includes an elongated conveying apparatus such as an elongated table 12 including a plurality of rollers 14 on an upper side thereof. The plurality of rollers 14 are configured to spin as a forming tool 16 is conveyed along the rollers 14. As seen in FIG. 1, the tool 16 is conveyed in a right-to-left direction (indicated by arrow 28) along the rollers 14 via an actuator 18, which in the depicted embodiment is a winch operatively connected to the tool 16 via a cable 20. In such embodiments, as the winch 18 retracts and wraps up the cable 20, the winch 18 pulls the tool 16 along the rollers 14. Any other suitable type of actuator 18 can be used to push, pull, or otherwise move the tool 16 along the rollers 14 without departing from the scope of the invention.

Figure 5:
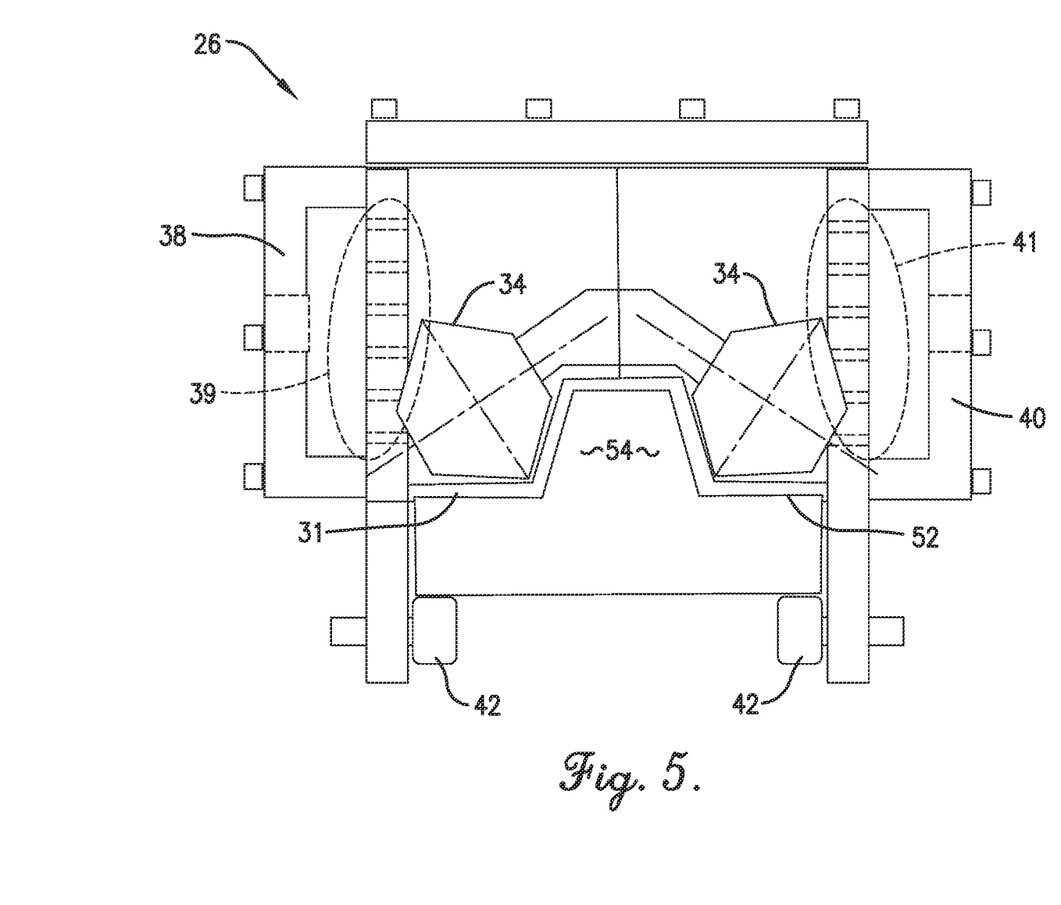
FIG. 5 is a front elevation view of the pressure vessel shown in FIGS. 2-4.

As best seen in FIG. 5, the tool 16 has a cross-sectional shape corresponding to the cross-sectional shape of a composite part 22 being formed by the tooling assembly 10. For example, in the depicted embodiment the tooling assembly 10 is being used to form a hat-shaped stringer 22, and thus a cross-sectional shape of the tool 16 includes a generally horizontal upper surface 52 with a trapezoidal protrusion 54 extending therefrom. In this regard, when pre-impregnated plies of fiber, webbing, or the like are placed on the tool 16 and hardened or cured in place, the resulting composite part 22 will have a cross-sectional shape corresponding to the upper surface of the tool 16—in this instance a hat shape. In other embodiments, tools having a different profile can be utilized to result in any desired cross-sectional shape of the resulting composite part, such as, for example, tools that result in I-, J-, Y-, and Z-shaped stringers or similar.

The tooling assembly 10 further includes an oven 24 or other heat source, and a pressure vessel 26 downstream of the oven 24. As the tool 16 is pulled or otherwise conveyed along the rollers 14, plies of pre-impregnated fibers 23 or other webbing are placed onto the upper side of the tool 16. More particularly, the tooling assembly 10 may include multiple spools 27 of pre-impregnated fibers 23 such that as the tool 16 moves along the rollers 14 the plies 23 are spooled out and layered onto the tool 16 upstream of the oven 24. In this regard, a thickness of the composite part 22 is varied by adjusting the number of plies of pre-impregnated fiber 23 or other material layered onto the tool 16 along the length of the composite part 22. That is, the thickness is adjusted by adding ply drops, as discussed.

As the tool 16, and thus the plies of pre-impregnated fiber 23 laying thereon, is conveyed through the oven 24, the plies 23 are heated causing the resin contained therein to liquify. This results in initial bonding of the plies of material 23, as the resin melds and holds the stack of plies 23 together. The tool 16 and plies 23 are then conveyed through wheels 34 that insure that the plies are close to the tool surface before they enter the pressure vessel 26 for further temperature and pressure treatment of the plies 23, ultimately resulting in the finished composite part 22 exiting a downstream end of the pressure vessel 26.

As best seen in FIGS. 2-5, the pressure vessel 26 extends along a portion of the elongated table 12 from an upstream end 30 to a downstream end 32. The pressure vessel 26 generally includes a central portion 36 that receives the tool 16 passing therethrough, and one or more manifolds 38, 40 extending outward from the central portion 36. In some embodiments, the pressure vessel 26 includes a plurality of external rollers 42 along which the tool 16 rolls as it passes through the pressure vessel 26, and an open interior chamber 44 that faces an upper surface of the tool 16 as it is conveyed through the pressure vessel 26. More particularly, the rollers 42 push the plies against the tool 16 and position the tool 16 such that the plies 23 thereon clear the entrance of the chamber 44 as the tool 16 passes therethrough.

Figure 3:
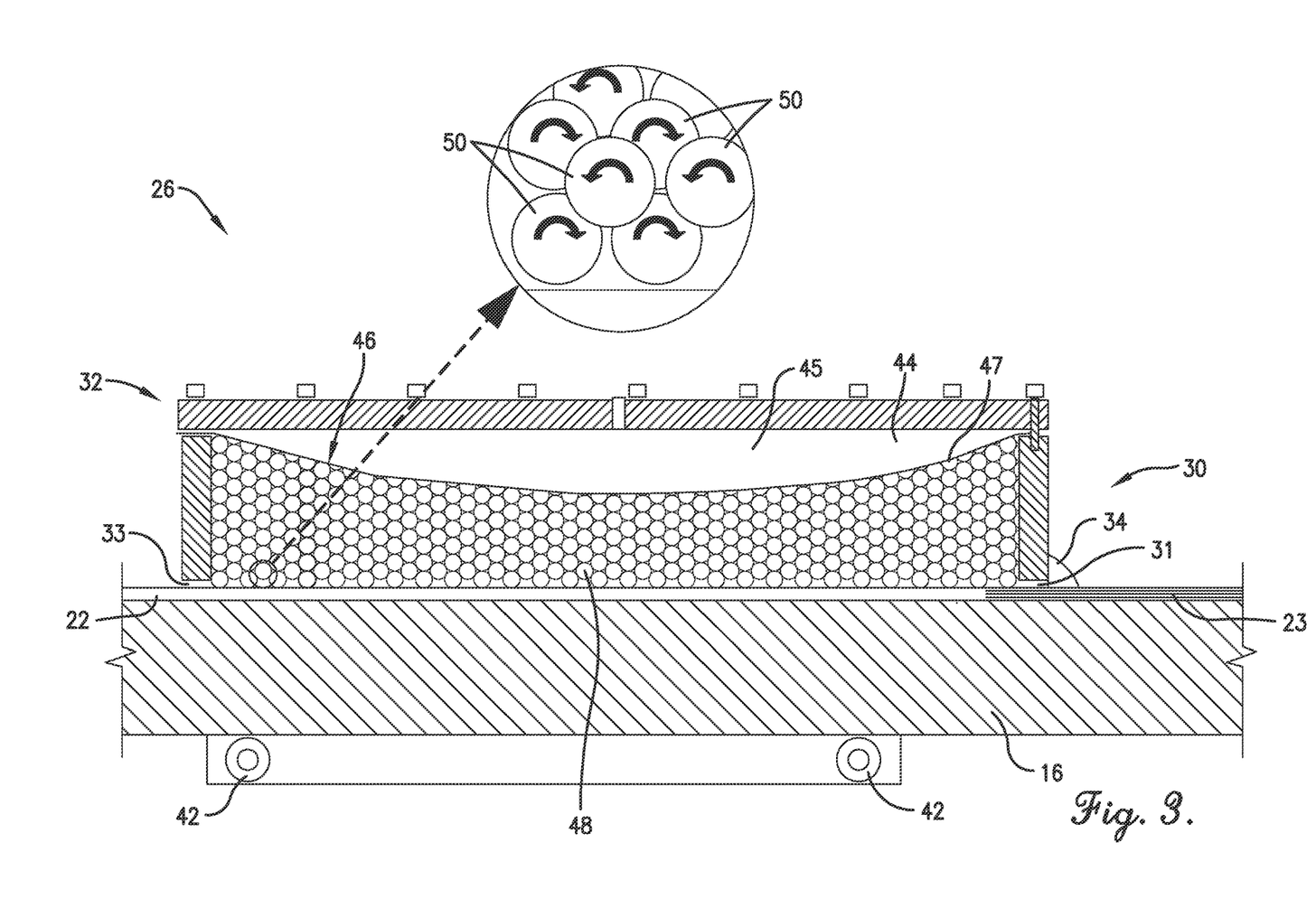
FIG. 3 is a cross-sectional view of the pressure vessel as viewed along line A-A in FIG. 2.

The interior chamber 44 includes a temperature-controlled sphere portion 48 including plurality of spheres 50, and a regulated air portion 45 including a diaphragm 46. In some embodiments the diaphragm 46 includes an inflatable bladder or similar component. Inflating or deflating the diaphragm 46 with a compressed gas increases or decreases, respectively, the pressure placed on the plurality of spheres 50, which in turn press on the plies 23 thus pressure treating the curing or hardening material, as will be discussed in more detail below. Certain portions of the entrance opening 51 may extend farther forward than the other portions of the entrance opening thereby allowing the pressure of the balls to be applied to these area of the plies sooner than others. This will apply progressive pressure application as can be necessary to prevent wrinkling of the material that may occur when applying pressure to the entire part width simultaneously. In some embodiments, the diaphragm 46 may include a liner 47 separating the regulated air portion 45 and the temperature-controlled sphere portion 48. The diaphragm liner 47 may include a low friction surface facing the temperature-controlled sphere portion 48 such that the plurality of spheres 50 can freely roll against the insert 47.

Each manifold 38, 40 is operatively connected to the interior chamber 44 via respective openings 39, 41 in the sidewalls of the central portion 36. The manifolds 38, 40 circulate hot or cold air through the interior chamber 44 and in the space between the plurality of spheres 50 during the forming process. For example, when the composite part 22 is being formed using thermoplastic polymer—i.e., a polymer that turns to liquid when heated and turns solid when cooled—the manifolds 38, 40 circulate cold air throughout the interior chamber 44 and in between the spheres 50 to cause the resin to freeze while being compacted by the pressurized spheres 50. Alternatively, when the composite part 22 is being formed using a thermosetting polymer—i.e., a polymer that cures at elevated temperatures—the manifolds 38, 40 circulate hot air throughout the interior chamber 44 and in between the spheres 50 to cause the resin to cure while being compacted by the pressurized spheres 50.

In some embodiments, a membrane 25 is overlaid on the plies 23 before the tool 16 enters the pressure vessel 26 in order to protect the plies 23 from direct contact with the spheres 50. For example, the membrane 25 may be spooled onto the plies 23 after the tool 16 leaves the oven 24, as shown in FIG. 1. In other embodiments, the membrane 25 may be overlaid on the plies 23 anywhere along the tooling assembly 10 upstream of the pressure vessel 26 without departing from the scope of this invention. For example, in some embodiments the membrane 25 may be overlaid on the plies 23 upstream of the oven 24 without departing from the scope of this invention. In some embodiments, the membrane 25 is a metal foil overlaid the plies 23. In other embodiments, the membrane 25 is a plastic film or bag that overlays or surrounds the plies 23. In some embodiments, the membrane 25 is vacuumed sealed against the plies 23. In any event, the membrane 25 is used to isolate the plies 23 forming the composite part 22 from the plurality of spheres 50 in the interior chamber 44.

Figure 2:
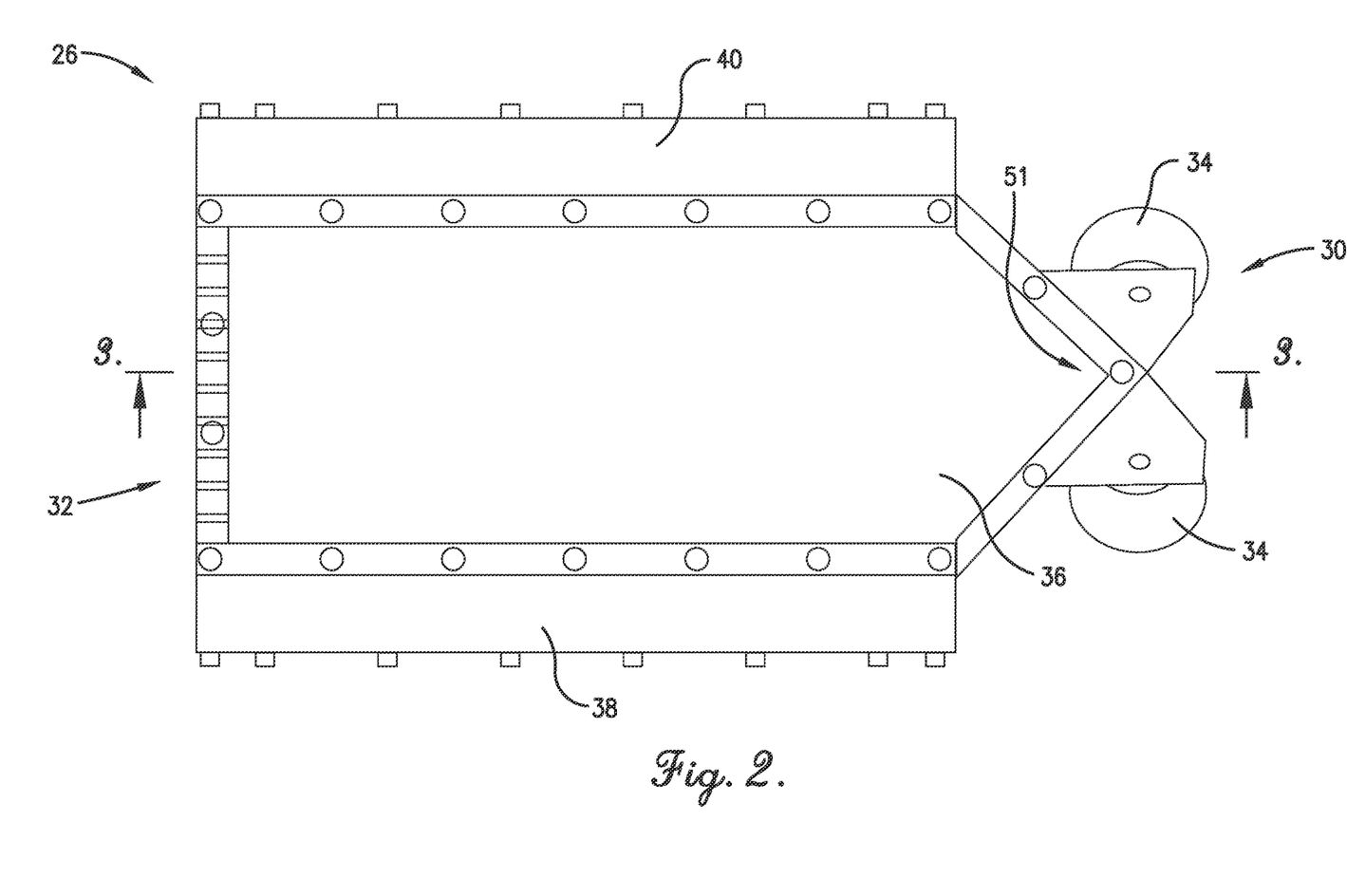
FIG. 2 is a top plan view of a pressure vessel forming part of the tooling assembly shown in FIG. 1.
Figure 4:
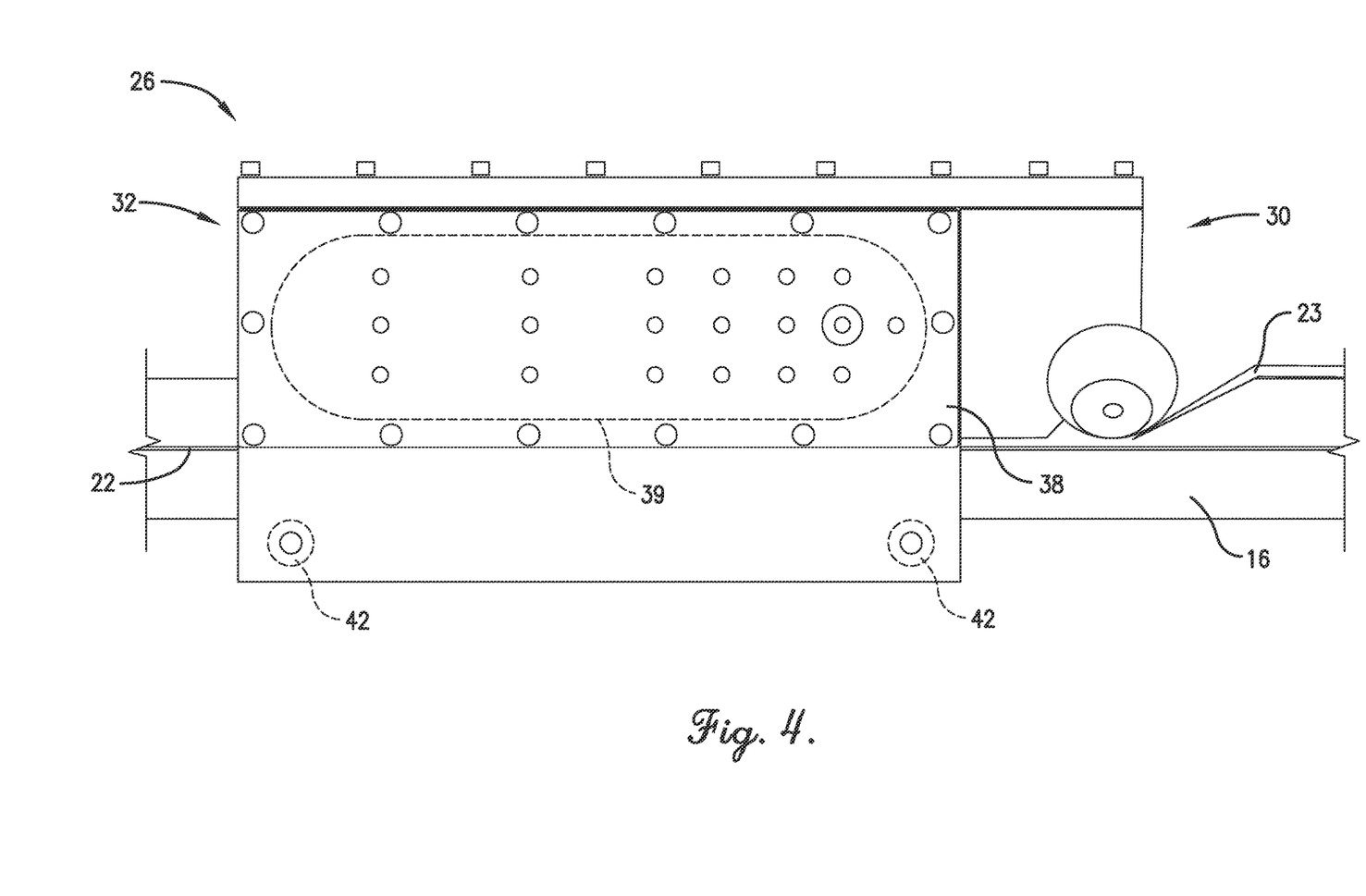
FIG. 4 is a side elevation view of the pressure vessel shown in FIG. 2-3.

The pressure vessel 26 further includes an upstream opening 31 at the upstream end 30 and a downstream opening 33 at the downstream end 32. The upstream and downstream openings 31, 33 have generally the same shape as the outer perimeter of the tool 16, however the openings 31, 33 are slightly larger than the tool 16 thus forming a clearance between the openings 31, 33 and the upper surface of the tool 16 so that the plies 23 can pass therebetween. The clearance formed at the openings 31, 33 accommodate varying thicknesses of plies 23 entering and exiting the pressure vessel 26. Thus, the tooling assembly 10, and more particularly the pressure vessel 26 of the tooling assembly 10, accommodates composite parts 22 being formed with integral ply drops, unlike known continuous process such as pultrusion processes in which the die cannot accommodate parts having varying thicknesses. However, the clearances formed at the openings 31, 33 are less than the diameter of each the plurality of spheres 50 so that the spheres 50 do not escape the interior chamber 44 as the tool 16 and plies 23 are being conveyed there through. The spheres near the entrance and exit may be larger than the spheres near the midpoint of the chamber, which may enable larger clearances at the openings 31, 33 while preventing smaller spheres from escaping the interior chamber 44. Partitions may be present in the chamber to prevent or reduce the mixing of different sizes of spheres and thereby prevent or reduce the migration of smaller spheres to the entrance or exit regions. In some embodiments, the spheres may deviate from perfect sphericity. Therefore, the term sphere, as used herein, shall include particles, grains, aggregate materials, or the like having a sphericity of at least 0.50. Preferably, the spheres may have an average sphericity of at least 0.80. More preferably, the spheres may have an average sphericity of at least 0.99. Moreover, in some embodiments the spheres 50 may be formed from a ferromagnetic material, and the pressure vessel 26 may further include an electromagnetic to suspend the spheres 50 when the tool 16 is not in place or when switching between tools 16 so that the spheres 50 do not escape through the upstream or downstream openings 31, 33.

In some embodiments the pressure vessel 26 includes a pair of wheels 34 at the upstream end 30 of the vessel 26, which serves to help place and flatten the membrane 25 as the tool 16 enters the pressure vessel 26. More particularly, the wheels 34 are placed just before the upstream opening 31 and have a cross-sectional profile mirroring the upper surface of the tool 16 (FIG. 5) such that the wheels 34 compact the membrane 25 and plies 23 sufficiently to insure that the membrane 25 or the plies 23 does not contact the edges of the upstream or downstream openings 31, 33. In some embodiments the wheels 34 may extend into the oven or may be otherwise heated to prevent them from cooling the plies before pressure is applied in the chamber.

By conveying the tool 16 with the plies 23 on the upper surface thereof through the described tooling assembly 10, a composite part 22 having an infinite length and varying cross-section (i.e. ply drops) can be formed using a continuous manufacturing process without the need for expensive tooling and without requiring time consuming batch manufacturing or the like. This will be more apparent with reference to FIG. 6, which is a flowchart outlining a process of forming a composite part 22 using the above-described tooling assembly 10.

Figure 6:
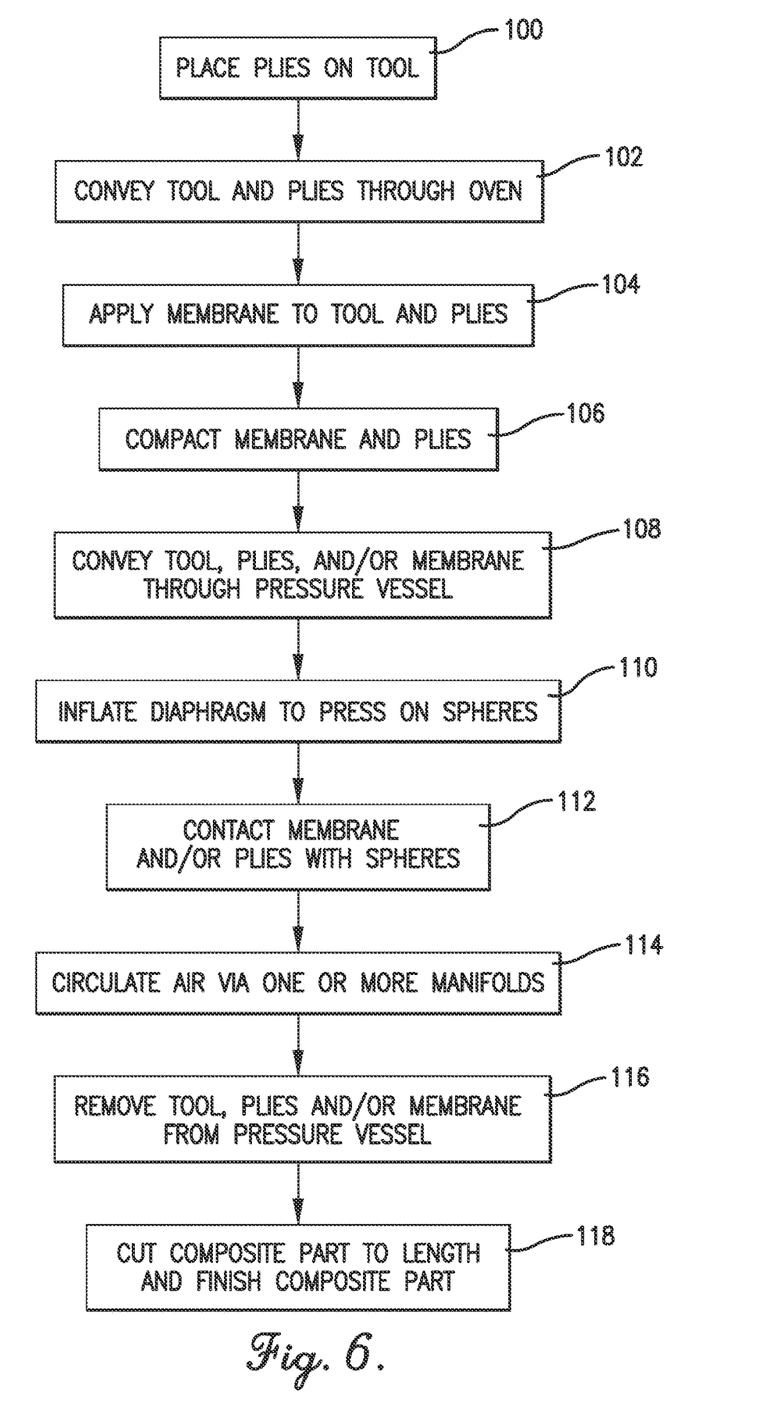
FIG. 6 is flowchart of a method used to produce a composite part using the tooling assembly shown in FIG. 1.

At step 100, multiple plies of a pre-impregnated fibers 23 are stacked onto a tool 16 having a cross-sectional profile mirroring the cross-sectional profile of the composite part 22 being formed. Again, when the composite part 22 is a hat-shaped stringer, the profile will be substantially similar to that shown in FIG. 5, but other profiles can be used without departing from the scope of the invention. In some embodiments, the plies 23 are spooled onto the tool 16 from one or more spools 27. Moreover, to create varying cross-sectional thicknesses along the length of the composite part 22, the amount of plies 23 being spooled onto the tool as the tool 16 is conveyed through the tooling assembly 10 is periodically varied, thus creating ply drops and a non-constant cross-sectional thickness, as discussed.

At step 102 the tool 16 and plies 23 thereon are conveyed through an oven 24. Although in the embodiment shown the tool 16 is conveyed via winch 18 attached by a cable 20 pulling the tool 16 through the oven 24 and the pressure vessel 26, any other method of conveying the tool 16 in a generally horizontal direction can be employed without departing from the scope of this invention. As the tool 16 and plies 23 move through the oven 24, the resin of the pre-impregnated plies 23 is heated and liquified, thus causing the stack of plies 23 to generally meld together.

At step 104, the membrane 25 is applied to the plies 23 and the tool 16. More particularly, the membrane 25 is overlaid on the uncured for thermosets, or cold for thermoplastics, pre-impregnated plies 23. In some embodiments, the membrane 25 is vacuum sealed at step 104 over the tool 16 and plies 23. At step 106, as the tool 16 continues to move in the direction of travel 28, the membrane 25 and plies 23 underneath the membrane 25 are compacted via the wheels 34 so that the plies 23 and membrane 25 do not contact the upstream opening 31 of the pressure vessel 26 as the tool 16 enters the pressure vessel 26.

At steps 108-114, the plies 23 are pressure treated and hardened or cured within the pressure vessel 26. More particularly, at step 108 the tool 16 and plies 23 are conveyed through the vessel 26, which in some embodiments includes either pulling or pushing the tool 16 with an actuator 18, overcoming the drag of the spheres 50 rolling against the part and tool 16. Simultaneously with step 108, at steps 110 and 112 the diaphragm 46 is inflated such that the spheres 50 are pressed against the plies 23 and tool 16. The diaphragm 46 may include any suitable compressed gas that is pumped into and out of the space above the diaphragm 46 as desired such that pressure is created by the compressed gas acting on a diaphragm 46 on the opposite side of the interior chamber 44 from the tool 16. At steps 108-112, relative motion between the pressure vessel 26 and the tool 16 is maintained in the direction of the prismatic profile axis such that the plies 23 become squeezed between the tool 16 and the plurality of spheres 50 (e.g. trapped ball bearings or the like) in a zone of high pressure over the length of the vessel 26. The cumulative force from the pressure on the spheres 50 is reacted into the tool 16 via the rollers 42 that engage the back side of the tool 16.

In this regard, profile changes due to ramps, ply drops, or section geometry changes are accommodated by inherent flexibility of the spheres 50 and diaphragm 46 within the pressure vessel 26. That is, unlike pultrusion with a rigid die where the profile thickness must be constant, the changing composite part 22 thickness can be accommodated because the spheres 50 can move slightly by rearranging or by deflecting the diaphragm 46. Moreover, unlike dies used in pultrusion processes, the clearance between the pressure vessel 26 and the tool 16 at the upstream opening 31 further allows for changes in the profile of the composite part 22 to pass therethrough but prevents the spheres 50 from escaping. Put another way, the diameters of the plurality of spheres 50 are larger than the variation of the profile shape of the composite part 22 over its length.

The spheres 50 within the pressure vessel 26 have low rolling friction since each layer of spheres rotate in opposite directions throughout the depth of the vessel 26. In some embodiments, a liner 47 is provided between the regulated air portion 45 and the temperature-controlled sphere portion 48, which is covered with ball transfer rollers or roller bearings creating a low-friction surface for an uppermost layer of the plurality of spheres 50 to roll against. Moreover, in some embodiments the plurality of spheres 50 are rigid; that is, they are made of a material that can withstand much higher temperatures than elastomeric materials typically used to provide compliance to changing profiles. In any event, the spheres 50 force the plies 23 in compliance with the tool 16 and compact the plies 23 as they cure or solidify.

In some embodiments, hot or cold air is circulated through the interior chamber 44 of the pressure 26 via one or more manifolds 38, 40 at step 114. Namely, when a thermoset polymer is being used to construct the composite part 22, heated air is circulated through the interior chamber 44 curing the resin. And when a thermoplastic polymer is being used, cooled air is circulated through the interior chamber 44 in order to solidify the resin, At step 116, the tool 16 is removed from the pressure vessel 26 via the downstream opening 33. At this point the resin will have cured or solidified, forming the composite part 22 on the upper surface of the tool 16. Optionally, if the tool 16 is to be completely removed from the pressure vessel 26 such at the end of run or when switching between tools 16, an electromagnet within the pressure vessel 26 is activated at step 116, which in turn attracts and suspends the spheres 50 (when the spheres are constructed from a ferromagnetic material) so that the spheres 50 do not escape the vessel 26 via the upstream or downstream openings 31, 33. And finally, at step 118 the composite part 22 is cut to length or otherwise finished such that it is ready for installation on an aircraft skin or other vehicle component. In embodiments implementing a membrane 25, the membrane 25 is removed and discarded during this finishing step 118.

Although the invention has been described with reference to the embodiments illustrated in the attached drawings, it is noted that equivalents may be employed without departing from the scope of the invention as recited in the claims.

What is claimed is:

1. A pressure vessel for forming a composite part, the pressure vessel comprising:
    an entrance opening provided at an upstream end of the pressure vessel configured to receive a forming tool supporting a plurality of plies;
    an exit opening provided at a downstream end of the pressure vessel configured to permit the forming tool to exit the pressure vessel after it is conveyed through the pressure vessel;
    an interior chamber between the entrance opening and the exit opening; and
    a plurality of spheres within the interior chamber, wherein the plurality of spheres are configured to press against the plurality of plies as the forming tool is conveyed through the pressure vessel.

2. The pressure vessel of claim 1 further comprising a diaphragm configured to expand and restrict as a compressed gas enters and exits the diaphragm, wherein the diaphragm is configured to push the plurality of spheres thereby causing the plurality of spheres to increase the pressure with which the plurality of spheres push against the plurality of plies.

3. The pressure vessel of claim 2 further comprising an insert separating the diaphragm from the plurality of spheres, wherein the insert comprises at least one of a plurality of ball transfer rollers or a plurality of roller bearings.

4. The pressure vessel of claim 1 further comprising one or more manifolds configured to circulate air within the interior chamber as the plurality of spheres press against the plurality of plies.

5. The pressure vessel of claim 1, wherein the forming tool is further configured to support a membrane overlaying the plurality of plies, and wherein the pressure vessel further comprises a plurality of wheels proximate the entrance opening and configured to compact the plurality of plies and the membrane prior to the plurality of plies and membrane entering the pressure vessel.

6. The pressure vessel of claim 1 further comprising a plurality of rollers configured to movably support the forming tool as the forming tool is conveyed through the pressure vessel.

7. The pressure vessel of claim 1, wherein certain portions of the entrance opening may extend farther forward than other portions of the entrance opening thereby allowing pressure to be applied at the certain portions sooner, providing progressive pressure application to prevent wrinkling of the material which may be associated with applying pressure to the entire part width simultaneously.

8. A tooling assembly for forming a composite part, the tooling assembly comprising:
an elongated conveying apparatus;
a forming tool configured to support a plurality of plies used to form the composite part, the forming tool movably supported by the elongated conveying apparatus; and
a pressure vessel disposed along the elongated conveying apparatus and comprising:
an entrance opening provided at an upstream end of the pressure vessel configured to receive the forming tool as the forming tool is conveyed along the elongated conveying surface;
an exit opening provided at a downstream end of the pressure vessel configured to permit the forming tool to exit the pressure vessel after it is conveyed through the pressure vessel; and
an interior chamber between the entrance opening and the exit opening and including a plurality of spheres, wherein the plurality of spheres are configured to press against the plurality of plies as the forming tool is conveyed through the pressure vessel.

9. The tooling assembly of claim 8, wherein the pressure vessel further comprises a diaphragm configured to expand and restrict as a compressed gas enters and exits the diaphragm, and wherein the diaphragm is configured to push the plurality of spheres thereby causing the plurality of spheres to increase the pressure with which the plurality of spheres push against the plurality of plies.

10. The tooling assembly of claim 9, wherein the pressure vessel further comprises an insert separating the diaphragm from the plurality of spheres, wherein the insert comprises at least one of a plurality of ball transfer rollers or a plurality of roller bearings.

11. The tooling assembly of claim 9 further comprising an oven disposed along the elongated conveying apparatus upstream of the pressure vessel.

12. The tooling assembly of claim 9, where the pressure vessel comprises one or more manifolds configured to circulate air within the interior chamber as the plurality of spheres press against the plurality of plies.

13. The tooling assembly of claim 9, wherein the plurality of plies is a plurality of pre-impregnated fibers, and wherein the tooling assembly further comprises a plurality of pre-impregnated fiber dispensing apparatuses configured to place the plurality of plies on the forming tool.

14. The tooling assembly of claim 9 further comprising at least one membrane dispensing apparatus configured to place a membrane over the plurality of plies prior to the plurality of plies entering the pressure vessel.

15. The tooling assembly of claim 14, wherein the pressure vessel further comprises a plurality of wheels proximate the entrance opening and configured to compact the plurality of plies and the membrane prior to the plurality of plies and membrane entering the pressure vessel.

16. A tooling assembly for forming a composite part, the tooling assembly comprising:
an elongated conveying apparatus;
a forming tool configured to support a plurality of plies used to form the composite part, the forming tool movably supported by the elongated conveying apparatus;
a plurality of spheres made of a rigid material, wherein the plurality of spheres includes at least one of a plurality of particles each having a sphericity of at least 0.50, a plurality of grains each having a sphericity of at least 0.50, or a plurality of aggregate materials each having a sphericity of at least 0.50; and
a pressure vessel disposed along the elongated conveying apparatus and comprising:
an entrance opening provided at an upstream end of the pressure vessel configured to receive the forming tool as the forming tool is conveyed along the elongated conveying surface,
an exit opening provided at a downstream end of the pressure vessel configured to permit the forming tool to exit the pressure vessel after it is conveyed through the pressure vessel,
an interior chamber between the entrance opening and the exit opening, wherein the plurality of spheres are located within the interior chamber, wherein the plurality of spheres are configured to press against the plurality of plies as the forming tool is conveyed through the pressure vessel, and
a diaphragm configured to expand and restrict as a compressed gas enters and exits the diaphragm, and wherein the diaphragm is configured to push the plurality of spheres thereby causing the plurality of spheres to increase the pressure with which the plurality of spheres push against the plurality of plies.

17. The tooling assembly of claim 16, where the pressure vessel comprises one or more manifolds configured to circulate air within the interior chamber as the plurality of spheres press against the plurality of plies.

18. The tooling assembly of claim 16, wherein the spheres comprise a ferromagnetic material, wherein the tooling assembly further comprises an electromagnetic device configured to selectively suspend the spheres.

19. The tooling assembly of claim 16, wherein the plurality of plies is a plurality of pre-impregnated fibers, and wherein the tooling assembly further comprises a plurality of pre-impregnated fiber dispensing apparatuses configured to place the plurality of plies on the forming tool.

20. The tooling assembly of claim 16 further comprising at least one membrane dispensing apparatus configured to place a membrane over the plurality of plies prior to the plurality of plies entering the pressure vessel.

* * * * *